(12) United States Patent
Synnestvedt et al.

(10) Patent No.: US 11,629,275 B2
(45) Date of Patent: *Apr. 18, 2023

(54) METHOD FOR FORMATION AND APPLICATION OF ADHESIVE

(71) Applicant: Zephyros, Inc., Romeo, MI (US)

(72) Inventors: Blake Synnestvedt, Bloomfield Hills, MI (US); Craig Knepper, Shelby Township, MI (US); David Egle, Flint, MI (US); Patrick Moore, Lapeer, MI (US); Jeanne Bednarski, Ray Township, MI (US); David Sheasley, Rochester, MI (US)

(73) Assignee: Zephyros, Inc., Romeo, MI (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/882,282

(22) Filed: Jan. 29, 2018

(65) Prior Publication Data

US 2018/0148620 A1 May 31, 2018

Related U.S. Application Data

(63) Continuation of application No. 14/186,585, filed on Feb. 21, 2014, now Pat. No. 9,879,162.

(60) Provisional application No. 61/768,070, filed on Feb. 22, 2013.

(51) Int. Cl.
| | | |
|---|---|---|
| *C09J 163/00* | (2006.01) | |
| *C08G 59/40* | (2006.01) | |
| *C08L 51/00* | (2006.01) | |
| *C08L 71/12* | (2006.01) | |
| *C09J 4/00* | (2006.01) | |

(52) U.S. Cl.
CPC ........ *C09J 163/00* (2013.01); *C08G 59/4021* (2013.01); *C08L 51/00* (2013.01); *C08L 71/12* (2013.01); *C09J 4/00* (2013.01); *Y10T 156/10* (2015.01)

(58) Field of Classification Search
None
See application file for complete search history.

(56) References Cited

U.S. PATENT DOCUMENTS

| 7,043,815 | B2 | 5/2006 | Lande et al. | |
|---|---|---|---|---|
| 2005/0217785 | A1* | 10/2005 | Hable | B05D 1/34 |
| | | | | 156/60 |
| 2006/0188726 | A1* | 8/2006 | Muenz | C08J 9/0061 |
| | | | | 428/413 |
| 2008/0308212 | A1* | 12/2008 | Sheasley | C09J 163/00 |
| | | | | 156/78 |
| 2011/0098382 | A1 | 4/2011 | Czaplicki | |
| 2014/0037966 | A1* | 2/2014 | Renkel | C09J 175/04 |
| | | | | 428/413 |

FOREIGN PATENT DOCUMENTS

| CN | 101772532 A | 7/2010 | |
|---|---|---|---|
| EP | 1683845 A1 | 7/2006 | |
| WO | 2012/013330 A2 | 2/2012 | |
| WO | WO-2012139974 A2 * | 10/2012 | ............. B29C 43/12 |

OTHER PUBLICATIONS

Hexion, "EPON 828," pp. 1-8, (2005) (Year: 2005).*
Covestro, "Desmodur VL R 10," pp. 1-3, (2019) (Year: 2019).*
ACCI Specialty Materials, "Technicure 54," pp. 1, (created 2015). (Year: 2015).*
International Search Report and Written Opinion, Application No. PCT/US2014/017702, dated May 8, 2014.
Chinese Office Action dated May 30, 2016, Application No. CN201480009735.9.

* cited by examiner

*Primary Examiner* — Randy P Gulakowski
*Assistant Examiner* — Ha S Nguyen
(74) *Attorney, Agent, or Firm* — The Dobrusin Law Firm, PC

(57) ABSTRACT

An improved approach toward the formation of an adhesive comprising a separated liquid component and solid component and application of the adhesive to a substrate immediately upon mixing the liquid and solid components.

15 Claims, No Drawings

METHOD FOR FORMATION AND APPLICATION OF ADHESIVE

FIELD OF THE INVENTION

The present invention generally relates to methods for the formation of an adhesive comprising a liquid component and solid component and application of the adhesive to a substrate upon mixing the liquid and solid components.

BACKGROUND OF THE INVENTION

The transport and use of activatable adhesive materials presents a number of challenges with respect to material handling and the avoidance of premature activation. If both liquid and solid components of the adhesive are combined prior to shipment, the adhesive is challenging to handle, leaves behind substantial residual material in any shipping container if shipped in paste form and may be prone to premature activation or blocking if shipped in pellet form.

SUMMARY OF THE INVENTION

The present teachings meet one or more of the above needs by providing a method for forming an adhesive for applying to a substrate comprising providing a first component in a generally liquid state and providing a second component in a generally solid state. The first and second component may be mixed immediately prior to application of the resulting adhesive to a substrate. The second component may have a pre-determined softening temperature and may include at least one polymeric ingredient. The method further provides for heating at least the second component to a temperature above the softening temperature. The method may also include mixing the first and second component to define a generally homogeneous mixture and forming an uncured activatable adhesive that upon cooling to room temperature is optionally generally dry to the touch.

The first component may have a viscosity of at least about 0.001 PaS at 23° C. as measured by a viscometer available from Brookfield Engineering Laboratories, Middleboro, Mass. The second component may have a softening point of at least about 40° C. as measured by thermal mechanical analysis. The activatable adhesive may be expandable. One or more of the first component and second component may contain a curing agent. One or more of the first component and second component may contain a curing agent accelerator. The uncured activatable adhesive may be dry to the touch. One of the first component or second component both includes a curing agent and may be substantially free of a curing agent accelerator. The uncured activatable adhesive may be applied to a member for reinforcing a vehicle roof.

The step of mixing the first component and second component may take place in an extrusion device. Upon mixing the first and second components, the method may include a step of applying the uncured activatable adhesive to a surface using robotic application. Upon mixing the first and second components, the method may include the step of applying the uncured activatable adhesive to the substrate while in a fluidic state prior to cooling to room temperature. The uncured activatable adhesive may be applied to join a first substrate and a second substrate, the first and second substrate being formed of dissimilar materials. The uncured activatable adhesive may have a viscosity that allows robotic application to a substrate yet is substantially free of smearing after application to the substrate. The uncured activatable adhesive may be applied to a metallic substrate. The uncured activatable adhesive may be applied to a polymeric substrate. The uncured activatable adhesive may be applied to a substrate at a first location, shipped to a second location, and activated at the second location.

The first component and second component may be shipped in separate containers. The second component may be transported in pellet form separate from the first component prior to mixing.

The adhesive formation and application methods disclosed herein contemplate an adhesive and a method of adhesive application wherein a solid component and liquid component are shipped separately and combined for formation of the adhesive just prior to applying the adhesive to a substrate. The solid component and liquid component are formed so that only one of the components includes a curing agent accelerator while the other includes a curing agent. This separation of the curing agent and accelerator assist in substantially preventing any premature activation of the adhesive, the solid component, the liquid component, or combinations thereof.

DETAILED DESCRIPTION

In general, the teachings herein provide for an adhesive composition that is formed by combining a liquid component and solid component just prior to application of the adhesive to a substrate. The adhesive composition may be formulated so that only one of the liquid or solid components includes a curing agent accelerator, while the other includes a curing agent. Separation of the curing agent and curing agent accelerator prior to application on a substrate substantially prevents activation of the adhesive prior to application of the adhesive to a substrate.

The teachings herein provide for an adhesive formulation, but the concept of shipping and storing solid components separate from liquid components and mixing said components just prior to application to a substrate may also be applied to sealing materials or materials for providing structural reinforcement.

During the formation process, a solid component (e.g., a combination of one or more solid components) and a liquid component (e.g., a combination of one or more liquid components) are mixed to form a substantially homogeneous adhesive composition. Immediately upon mixing (e.g., within about 5 minutes, within about 10 minutes, within about 30 minutes or within about 1 hour) the uncured activatable adhesive is applied to one or more substrates. Broadly, the solid components may be a material with a softening point of 40° C. or higher when measured by Thermal Mechanical Analysis. Further, the liquid components may be a material that flows under the force of gravity at 23° C.

The mixing of the liquid and solid components allows for combining certain materials only present in one of the liquid and solid component. Certain materials may be selected for inclusion in either the solid component or the liquid component. Specific materials may be selected so that contact between certain materials is prevented until mixing. As an example, the curing agent accelerator may be present in only one or the solid component or liquid component and may thus be separated from one or more curing agents prior to mixing. As a result, the adhesive may be free of any premature activation (e.g., activation prior to exposing the adhesive to a desired stimulus to cause activation (e.g., curing, expansion or the like)). The activation may be caused by exposure to heat, moisture, ultra violet light, or other activation stimuli.

Further, separation of the solid components and liquid components during shipping and storage and prior to mixing provides additional benefits. As one example, the solid components may be shipped and stored in pellet form, thereby minimizing or substantially eliminating any residual material (e.g., waste) remaining in shipping and/or storage containers after removal of the pellets from the shipping and/or storage container. By comparison, adhesives mixed prior to shipping may have a viscosity such that substantial waste may be left behind in any shipping/storage container. Any re-use of such container will require a separate cleaning step, which would not be required for the pellet containers described herein. Shipment of the liquid components separately may also result in reduced waste in shipping and/or storage containers and the possibility of shipping container re-use. Prior to being combined with the solid components, the liquid components have a viscosity that is substantially reduced as compared to the viscosity of the adhesive after mixing. Thus, minimal waste may remain in a shipping/storage container containing the liquid components.

The ability to achieve the above-described benefits of shipping and storing the adhesive as separate liquid and solid components results in reduced premature activation and reduced processing challenges based upon viscosity and tackiness issues of the adhesive post-mixing. Further, the adhesive is particularly well adapted for automated application to a substrate soon after mixing the liquid and solid components.

It should be recognized that simply because a material included in the adhesive is in liquid or solid form before inclusion in the adhesive does not necessarily ensure that it will be included in the liquid or solid components. As an example, the solid components may include materials that, when handled individually, may be in liquid form but are included as part of the solid components for purposes of the description provided herein. Conversely, materials provided as part of the liquid components described herein may be in solid form when handled individually.

In order to form a desirable adhesive that can be shipped and stored in separate liquid and solid components, the adhesive, the solid component, the liquid component or combinations thereof may include an epoxy based material. The epoxy may be a solid epoxy material, which would be formed as a portion of the solid components. The epoxy may be a liquid epoxy material, which would be formed as a portion of the liquid components. Further, the epoxy material may be liquid or solid and each may be included in the liquid component or solid component. The epoxy may be any dimeric, oligomeric or polymeric epoxy materials containing at least one epoxy functional group. Moreover, the term epoxy can be used to denote one epoxy or a combination of multiple epoxies. The materials may be epoxy-containing materials having one or more oxirane rings polymerizable by a ring opening reaction. The adhesive, the solid components, or the liquid components may include up to about 80% of an epoxy. The adhesive, the solid components, or the liquid components may include between about 2% and about 70% by weight epoxy, between about 4% and about 30% by weight epoxy, or even between about 7% and about 18% by weight epoxy. The adhesive may be substantially free of an epoxy material. The epoxy may be aliphatic, cycloaliphatic, aromatic or the like. The epoxy may include an ethylene copolymer or terpolymer that may possess an alpha-olefin. Preferably, an epoxy is added to the adhesive to increase the adhesion, flow properties or both, of the adhesive. The epoxy may include a phenolic resin, which may be a novolac type (e.g., an epoxy phenol novolac, an epoxy cresol novolac, combinations thereof, or the like) or other type resin. Other preferred epoxy containing materials include a bisphenol-A epichlorohydrin ether polymer, or a bisphenol-A epoxy resin which may be modified with butadiene or another polymeric additive. Moreover, various mixtures of several different epoxies may be employed as well. Examples of suitable epoxies are sold under the trade name DER® (e.g., DER 331, DER 661, DER 662), commercially available from the Dow Chemical Company, Midland, Mich.

The epoxy may be combined with a thermoplastic component, which may include styrenics, acrylonitriles, acrylates, acetates, polyamides, polyethylenes or the like. The thermoplastic component may be present in an amount of at least about 3% by weight of the adhesive, the solid components, or the liquid components. The thermoplastic component may be present in an amount of at least about 20% by weight of the adhesive, the solid components, or the liquid components. The thermoplastic component may be present in an amount of at least about 60% by weight of the adhesive, the solid components, or the liquid components. The thermoplastic component may be present in an amount of less than about 80% by weight of the adhesive, the solid components, or the liquid components. The thermoplastic component may be present in an amount of less than about 30% by weight of the adhesive, the solid components, or the liquid components. As with the epoxy, the thermoplastic material may be included with either the liquid components or solid components.

While it is contemplated that various polymer/elastomer adducts may be employed according to the present invention, one preferred adduct is an epoxy/elastomer adduct. The adhesive, the solid components, or the liquid components may thus include an elastomer-containing adduct. The epoxy/elastomer hybrid or adduct may be included in an amount of up to 80% by weight of the adhesive, the solid components, or the liquid components. The elastomer-containing adduct may be approximately at least 5%, more typically at least 7% and even more typically at least 10% by weight of the adhesive, the solid components, or the liquid components. The adduct may be up to 60% or more, but more preferably is about 10% to 30% by weight of the adhesive, the solid components, or the liquid components. Of course, the elastomer-containing adduct may be a combination of two or more particular adducts and the adducts may be solid adducts (e.g., included with the solid components) or liquid adducts (e.g., included with the liquid components) at a temperature of 23° C.

The adduct itself generally includes about 1:8 to 3:1 parts of epoxy or other polymer to elastomer, and more preferably about 1:5 to 1:6 parts of epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound may be a thermosetting elastomer. Exemplary elastomers include, without limitation, natural rubber, styrene-butadiene rubber, polyisoprene, polyisobutylene, polybutadiene, isoprene butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. The elastomer-containing adduct, when added to the adhesive, may modify structural properties of the adhesive such as strength, toughness, stiffness, flexural modulus, or the like.

The adhesive, the solid components, the liquid components, or any combination thereof, may also include one or more additional polymer and/or copolymer materials, such as thermoplastics, elastomers, plastomers, or combinations thereof. Polymers that might be appropriately incorporated into the adhesive include without limitation, polyolefin (e.g., polyethylene, polypropylene) polystyrene, polyacrylate, polyethylene oxide), poly(ethyleneimine), polyester, polyurethane, polysiloxane, polyether, polyphosphazine, polyimide, polyimide, polyisobutylene, polyacrylonitrile, polyvinyl chloride), poly(methyl methacrylate), poly(vinyl acetate), poly(vinylidene chloride), polytetrafluoroethylene, polyisoprene, polyacrylamide, polyacrylic acid, or polymethacrylate.

The adhesive, the solid components, the liquid components, or any combination thereof, may also include at least one impact modifier. Various impact modifiers may be employed in the practice of the present invention and often include one or more elastomers. The impact modifier may be at least 4%, at least 7%, at least 10%, at least 13% and even still more typically at least 16% by weight of the adhesive, the solid components, the liquid components, or any combination thereof. The impact modifier may be less than 90%, less than 40% or even less than about 30% by weight of the adhesive, the solid components, the liquid components, or any combination thereof.

The impact modifier may include at least one core/shell impact modifier. The impact modifier may be compromised of at least 60%, at least 80% or even at least 95% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The first and second polymeric materials of the core/shell impact modifier can include elastomers, polymers, thermoplastics, copolymers, other components, combinations thereof or the like. The first polymeric material, the second polymeric material or both of the core/shell impact modifier may include or may be substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

The adhesive, the solid components, the liquid components, or any combination thereof, may also include one or more curing agents and/or curing agent accelerators. Any curing agent accelerator may be included in only one of the solid components or liquid components and may be separated from one or more curing agents in an effort to prevent premature activation. Amounts of curing agents and curing agent accelerators may vary within the adhesive, the solid components, the liquid components, or any combination thereof. Exemplary ranges for the curing agents or curing agent accelerators present in the adhesive, the solid components, the liquid components, or any combination thereof, range from about 0.001% by weight to about 7% by weight.

The curing agents assist the adhesive in curing by cross-linking of the polymers, epoxy resins or both. The curing agents may also assist in thermosetting the adhesive. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. The curing agents may include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an irnidazole or a combination thereof) may also be provided for the adhesive, the solid components, the liquid components, or any combination thereof.

The adhesive, the solid components, the liquid components, or any combination thereof, may also include one or more fillers, including but not limited to particulated materials (e.g., powder), beads, microspheres, or the like. The adhesive, the solid components, the liquid components, or any combination thereof, may also be substantially free of any filler material. The adhesive, the solid components, the liquid components, or any combination thereof, may include a filler that comprises less than 25% by weight of the adhesive, the solid components, the liquid components, or any combination thereof. Ideally, the filler may comprise less than about 2.5% by weight of the adhesive, the solid components, the liquid components, or any combination thereof. Any filler present may include a material that is generally non-reactive with the other components present in the adhesive, the solid components, the liquid components, or any combination thereof.

Examples of fillers include silica, diatomaceous earth, glass, day (e.g., including nanoclay), talc, pigments, colorants, glass beads or bubbles, glass, carbon or ceramic fibers, nylon or polyimide fibers (e.g., Kevlar), antioxidants, and the like. Such fillers, particularly clays, can assist the adhesive in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

Non-limiting example formulations of the adhesive composition disclosed herein are set forth in Table 1 below. Amounts are listed in percent by weight. Presence in either the liquid component (L) or solid, component (S) is also indicated.

TABLE 1

|  | A | B | C | D |
|---|---|---|---|---|
| Bisphenol A solid epoxy resin | 14.0 (S) | 16.0 (S) | 22.0 (S) |  |
| Epoxy CTBN adduct solid | 16.0 (S) | 13.0 (S) | 6.0 (S) | 5.0 (S) |
| Phenoxy resin |  |  | 17.0 (S) | 17.0 (S) |

TABLE 1-continued

| | A | B | C | D |
|---|---|---|---|---|
| Epoxy phenol Novolac | 3.0 (S) | 2.0 (S) | | |
| Flexibilizer | | | 12.0 (L) 4.0 (S) | 26.0 (L) |
| Blowing agent | 1.5 (S) | 1.5 (S) | 1.4 (S) | 1.4 (S) |
| Liquid epoxy, Bisphenol A-based | 4.0 (L) | 3.0 (L) | 7.0 (L) | 7.0 (L) 16 (L) |
| Core/shell polymer | 13.0 (S) | 11.0 (S) | 21.0 (S) | 21.0 (S) |
| Ethylene co-polymer/terpolymer resin | 4.0 (S) | 4.0 (S) | | |
| filler | 42.2 (S) | 47.7 (S) | 5.9 (S) | 2.4 (S) |
| Dicyadinamide | 1.7 (S) | 15 (S) | 2.9 (S) | 3.4 (S) |
| Accelerator | 0.6 (L) | 0.3 (L) | 0.8 (L) | 0.8 (L) |
| Total | 100 | 100 | 100 | 100 |

Upon mixing of the solid and liquid components, the resulting adhesive may be applied immediately (e.g., within about 5 minutes, within about 10 minutes, within about 30 minutes or within about 1 hour) to a substrate. The mixing process may include a metering system such that a predetermined amount of solid component is mixed with a predetermined amount of liquid component to achieve a certain resulting adhesive formulation. The application process may be facilitated by an automated application device. The application device may be a robotic device. The application device may be such that mixing and application occurs from one device. The adhesive may be extruded and immediately applied. One non-limiting example is disclosed in U.S. Pat. No. 7,043,815, incorporated by reference herein for all purposes. Upon application, the adhesive is preferably div to the touch, such that substrates upon which the adhesive is applied can be easily packed, shipped and installed without challenges of tacky material. The adhesive is further formulated to resist smearing upon application which again facilitates packing, shipping and installation.

The adhesive may be applied after mixing to any suitable substrate for receiving the adhesive. The substrate may be a metallic substrate or a polymeric substrate. The substrate may be an aluminum substrate. The substrate may be a steel substrate. The substrate may be a component of a vehicle reinforcement system. The substrate may be a component of a vehicle roof reinforcement system. The adhesive described herein may be utilized for bonding two substrates together where the two substrates are formed of dissimilar materials. As a non-limiting example, the adhesive may be utilized to bond an aluminum substrate to a steel substrate.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consists of, the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

It is, understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not. It is, understood that the above description is intended to be illustrative and not restrictive. Many embodiments as well as many applications besides the examples provided will be apparent to those of skill in the art upon reading the above description.

The explanations and illustrations presented herein are intended to acquaint others skilled in the art with the invention, its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. An adhesive comprising a mixture of:
   a first component in a liquid state, the first component including a curing agent accelerator in an amount of from about 0.3% to about 0.8% by weight of the adhesive, and a liquid epoxy resin in a separate amount from about 4% to about 7% by weight of the adhesive;
   a second component in a solid state and having a predetermined softening temperature of at least about 40° C., includes a solid epoxy resin, at least one polymeric ingredient, and a curing agent;
   wherein:
   the second component has a softening temperature below an activation temperature in order to avoid premature curing of the second component; and
   (ii) the first component has a viscosity of at least about 0.001 Pa·s at 23° C. as measured by a viscometer, so that the viscosity facilitates mixing of the first and a softened second component in a metered system so that a predetermined amount of the first component is mixed with a predetermined amount of the second component to define a homogeneous mixture of the adhesive;
   wherein the second component includes a blowing agent which causes the adhesive to expand.

2. A vehicle structure comprising the adhesive of claim 1 applied to a first substrate prior to cooling to room temperature and at a first location.

3. The adhesive of claim 1, wherein the first component and second component are mixed in an extruder.

4. The adhesive of claim 1, wherein the adhesive is adapted for robotic application prior to cure of the adhesive.

5. The adhesive of claim 1, wherein the adhesive is adapted to be in a fluidic state prior to cooling to room temperature.

6. The adhesive of claim 1 wherein the adhesive is dry to the touch.

7. The adhesive of claim 4, wherein the adhesive is adapted to be applied to a first substrate and adhere to a second substrate when the first substrate and second substrate are formed of dissimilar materials.

8. The adhesive of claim 1, wherein a viscosity of the adhesive allows robotic application of the adhesive to a substrate.

9. The vehicle structure of claim 2, wherein the first substrate is a metallic substrate.

10. The vehicle structure of claim 2, wherein the first substrate is a polymeric substrate.

11. The adhesive of claim 1, wherein the second component is substantially free of a curing agent accelerator.

12. The adhesive of claim 1, wherein the second component is provided in pellet form prior to mixing.

13. The vehicle structure of claim 2, wherein the structure is a vehicle roof.

14. The vehicle structure of claim 2, wherein the first substrate is a polymeric substrate that adheres to a second polymeric substrate.

15. The adhesive of claim 1, wherein the adhesive is activated by exposure to heat.

* * * * *